US006406063B1

(12) United States Patent
Pfeiffer

(10) Patent No.: US 6,406,063 B1
(45) Date of Patent: Jun. 18, 2002

(54) PIPE FITTINGS

(75) Inventor: Pieter Geert Pfeiffer, Zundert (NL)

(73) Assignee: Fina Research, S.A., Feluy (BE)

(*) Notice: Subject to any disclaimer, the term of this patent is extended or adjusted under 35 U.S.C. 154(b) by 0 days.

(21) Appl. No.: 09/614,466

(22) Filed: Jul. 11, 2000

(30) Foreign Application Priority Data

Jul. 16, 1999 (EP) ............................................. 99113921

(51) Int. Cl.$^7$ ................................................ F16L 47/02
(52) U.S. Cl. ...................................... 285/21.2; 285/369
(58) Field of Search ............................... 285/21.1, 21.2, 285/369

(56) References Cited

U.S. PATENT DOCUMENTS

| | | | |
|---|---|---|---|
| 4,618,168 A | * 10/1986 | Thalmann et al. | 285/21.2 |
| 4,770,442 A | 9/1988 | Sichler | 285/21 |
| 4,927,183 A | * 5/1990 | Steinmetz et al. | 285/21.2 |
| 5,125,690 A | * 6/1992 | Taylor et al. | 285/21.2 |
| 5,364,130 A | 11/1994 | Thalmann | 285/21 |
| 5,462,314 A | * 10/1995 | Goto et al. | 285/21.2 |
| 5,618,065 A | * 4/1997 | Akiyama | 285/21.2 |

FOREIGN PATENT DOCUMENTS

| | | | |
|---|---|---|---|
| CH | 683026 | 12/1993 | |
| DE | 3932807 | 9/1989 | |
| EP | 0303909 | 2/1989 | |
| EP | 0693652 | 1/1996 | |
| GB | 1121850 | 7/1968 | |
| GB | 2299047 | 9/1996 | |
| JP | 405172289 | * 7/1993 | 285/21 |

* cited by examiner

Primary Examiner—Eric K. Nicholson
(74) Attorney, Agent, or Firm—Grady K. Bergen

(57) ABSTRACT

A pipe fitting for coupling together opposed ends of two plastics pipes by fusion welding, the pipe fitting comprising an annular body having an inner cylindrical surface of plastics material surrounding a cylindrical cavity for receiving opposed ends of two plastics pipes to be coupled together, an electrically conductive coil provided in said inner cylindrical surface and surrounding the cylindrical cavity, the coil having opposed ends, a pair of terminals each connected to a respective end of the coil and provided on the body for connection to a source of controlled electrical power, and an annular reinforcing member disposed in the body and surrounding the coil, the annular reinforcing member having a grooved surface which interfaces the annular body, the grooved surface defining a plurality of axially facing surfaces.

20 Claims, 2 Drawing Sheets

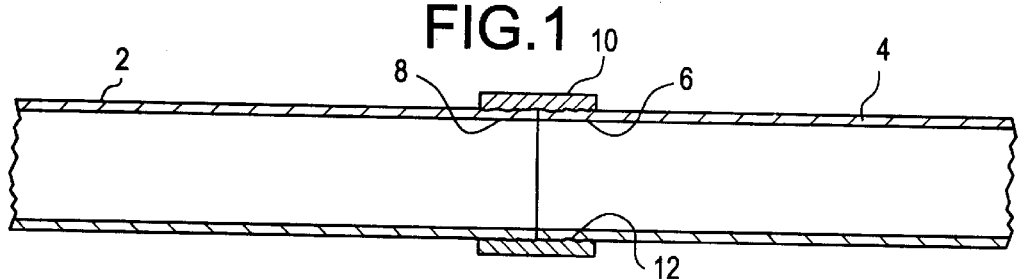
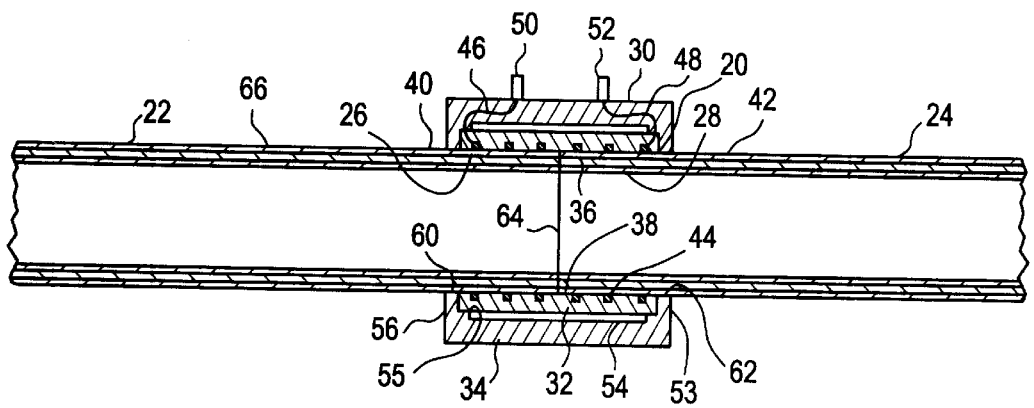
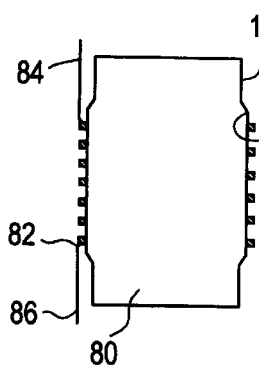 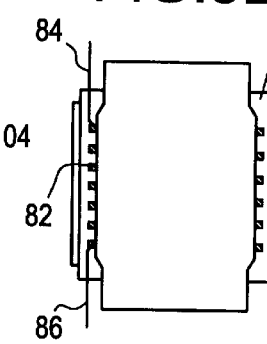 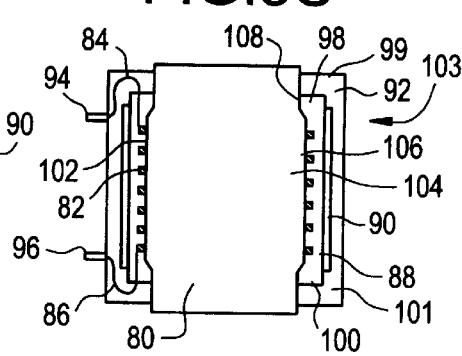

PIPE FITTINGS

BACKGROUND TO THE INVENTION

The present invention relates to pipe fittings, in particular pipe fittings for electrofusion of pipes to form a pipeline. The present invention also relates to a pipeline incorporating a pipe fitting. The present invention yet further relates to a method of producing a pipe fitting.

DESCRIPTION OF THE PRIOR ART

Plastics pipes, in particular pipes made of polyethylene, are widely known for use in forming pipelines for conveying fluids such as water or natural gas. Such pipelines are made by joining together a succession of individual pipes using pipe fittings. It is known in the art to use pipe fittings incorporating a heating coil which surrounds the abutting ends of two pipes to be joined together. When an electrical current is passed through the coil, the current causes plastics material in the pipe fitting to melt and to be fused to the plastics material of the two pipes by melt displacement, thereby forming a welded joint which seals the two pipe ends together. Such known electrofusion pipe fittings suffer from the technical disadvantage that they are limited to fluid pressures in the pipeline of a maximum of 25 bar. At higher pressures, the electrofused fitting fails, leading to leakage from or catastrophic failure of the pipeline. Such low pressure pipelines employ single-layer polyethylene pipes.

EP-A-0396273 discloses an electro-fusion pipe coupler for such low pressure pipelines which comprises an outer shell and an electric resistance heating coil secured therein by an intervening layer of injection moulded thermoplastics material.

DE-C-3932807 discloses a welding muff and a process for manufacturing it in which the welding muff comprises a thermoplastic, tubular muff body with a heating wire winding on its inner surface and a reinforcing layer connected to the muff body. The reinforcing layer is configured for ensuring that the welding pressure is absorbed during welding and the service life is prolonged.

CH-A-683026 discloses a welding muff for plastic pipes in which a reinforcing mesh of steel wire or a perforated steel tube is embedded in the welding muff.

U.S. Pat. No. 4,770,442 discloses an electroweld fitting or collar which reliably applies contact pressure in the welding zone by providing a reinforcement in the form of a winding or a tube arranged on the outer surface of the body of the fitting, with the thermal coefficient of expansion of the reinforcement being smaller than that of the body.

U.S. Pat. No. 5,364,130 discloses a heat welder with coupling for tubular plastic pipes in which as well as a unitarily formed coupling part, there is disclosed a pipe coupling made with an inner part in the form of a socket or sleeve and separate, engageable, shell-like outer parts. With such an arrangement, a desired, external force closure in the vicinity of the junction point of the pipes is brought about by engagement of two shell-like halves of reinforcement shells to form a force transfer bridge.

GB-A-2299047 discloses the manufacture of electrofusion fittings in which a body of thermoplastic material is moulded over a shape-retaining structure comprising an electrical heating element in a layer of thermoplastic polymeric sheet material.

GB-A-1121850 discloses a jointing method of pipe shaped plastics and jointing materials in which an electric heating wire is wound on one end portion of a plastic sheath of a plastic sheathed cable and then a plastic sleeve is placed on the outside surface of the electric heating wire in an overlapping manner. Thereafter, the heating wire is supplied with electric current while applying compressive pressure to the entire overlapped portion, so that the plastic sheath and the plastic sleeve are united into an integral body by heating.

EP-A-0693652 discloses an electric welding pipe joint in which two or more layers of an outer cylindrical thermoplastic resin member are formed around a resistance wire-wound inner cylindrical member by successive injection moulding steps. In order to reduce the injection moulding time, it is disclosed that inner and outer cylindrical members constituted by three layers are successively moulded, rather than a single thicker layer.

EP-A-0303909 discloses the manufacture of an electrofusion coupler in which a tubular plastics preform is wound with a resistance heating wire and the heating wire is fully embedded in the preform. Thereafter, an outer encapsulating jacket is injection moulded around the preform.

The specifications referred to hereinabove suffer from the problem that they are not particularly directed to the manufacture of electrofusion pipe fittings which can be employed with high fluid pressures in the pipeline, typically greater than about 25 bar.

High pressure pipelines are also known in the art in which reinforced pipes are employed at fluid pressures above 25 bar. Such reinforced pipes have multilayer constructions, for example of multiple plastics layers which may additionally include a reinforcing layer including a metal. For such high pressure pipelines, it is known to use a mechanical coupling to join abutting ends of two adjacent pipes together in a sealed manner. Such mechanical couplings comprise an annular metal member which is bolted in a sealed manner around the opposed abutting ends of the pipes or, as shown in FIG. 1, is threadably connected to the pipe ends. As shown in FIG. 1, two pipes 2,4 having respective abutting ends 6,8 to be sealably joined together are surrounded by an annular metal coupling 10 having a threaded inner annular surface 12 into which the ends 6,8 are screwed. Such mechanical couplings have the technical problem that they are subject to corrosion of the metal, which over time can lead to failure of the coupling.

SUMMARY OF THE INVENTION

There is a need in the art for a pipe fitting which enables electrofusion of pipes together in a high pressure pipeline.

Accordingly, the present invention provides a pipe fitting for coupling together opposed ends of two plastics pipes by fusion welding, the pipe fitting comprising an annular body having an inner cylindrical surface of plastics material surrounding a cylindrical cavity for receiving opposed ends of two plastics pipes to be coupled together, an electrically conductive coil provided in said inner cylindrical surface and surrounding the cylindrical cavity, the coil having opposed ends, a pair of terminals each connected to a respective end of the coil and provided on the body for connection to a source of controlled electrical power, and an annular reinforcing member disposed in the body and surrounding the coil, the annular reinforcing member having a grooved surface which interfaces the annular body, the grooved surface defining a plurality of axially facing surfaces.

The present invention yet further provides a pipeline including at least two polyethylene pipes having opposed ends which are coupled together by at least one pipe fitting according to the invention, the inner cylindrical surface of the annular body being fusion welded to an outer cylindrical surface of each pipe end, wherein the annular body is composed of polyethylene and the annular reinforcing member has at least the same tensile strength in a hoop direction as that of the polyethylene pipes.

The present invention yet further provides a method of producing a pipe fitting for coupling together opposed ends of two plastics pipes by fusion welding, the method comprising the steps of: (a) forming an electroconductive coil around a substantially cylindrical core body; (b) moulding a first annular body part of the pipe fitting around the coil and the core body and disposing an annular reinforcing member around the first annular body part; (c) moulding a second annular body part of the pipe fitting around the reinforcing member and the first annular body part and the core body to form the pipe fitting; and (d) removing the core body from the pipe fitting.

Steps (b) and (c) may be carried out as a sequence of steps or as a single step.

BRIEF DESCRIPTION OF THE DRAWINGS

Embodiments of the present invention will now be described, by way of example only, with reference to the accompanying drawings, in which:

FIG. 1 is a schematic sectional view through a known pipeline incorporating a known mechanical coupling;

FIG. 2 is a schematic sectional view through a pipeline formed in accordance with a first embodiment of the invention in which a pipe fitting in accordance with the invention is electrofused around two abutting pipe ends;

FIGS. 3(a), (b) and (c) show successive steps in a process for producing a pipe fitting in accordance with a second embodiment of the present invention;

DETAILED DESCRIPTION OF THE PREFERRED EMBODIMENTS

Figure 4:
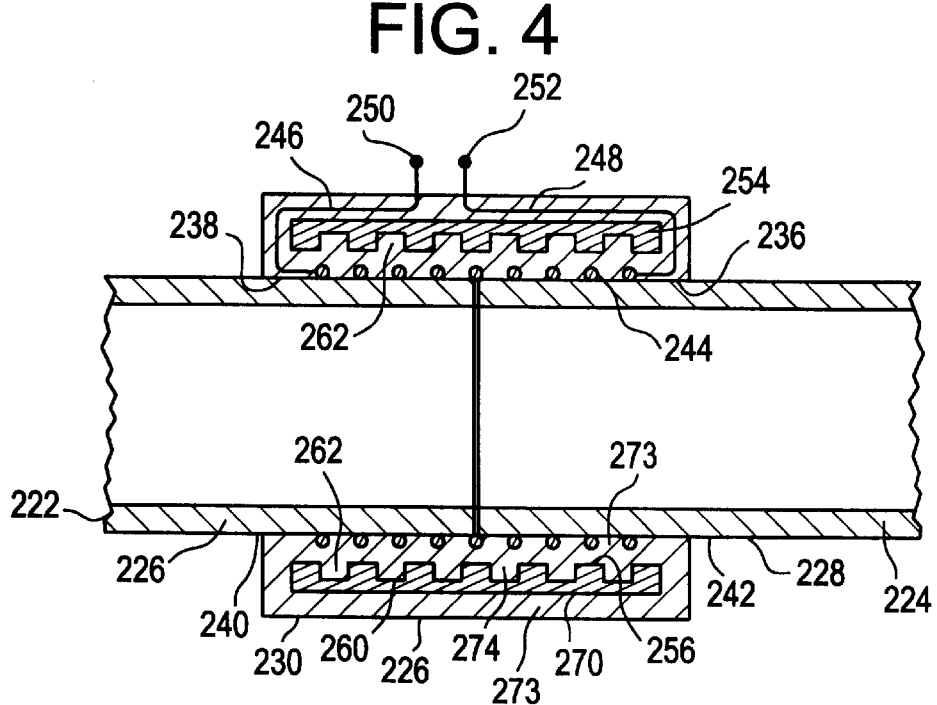
FIG. 4 is a schematic sectional view through a pipeline formed in accordance with a second embodiment of the present invention.

In the drawings, the width or thickness of some elements are exaggerated for the purpose of clarity of illustration.

Referring to FIG. 2 there is shown a pipeline incorporating a pipe fitting 20 in accordance with a first embodiment of the present invention. The pipeline includes plastics pipes, for example of polyethylene, having a multilayer construction. Typically, the pipes have a diameter of from 25 to 630 mm. A most typical diameter is from 90 to 315 mm. FIG. 2 shows two of the pipes 22,24 having opposed ends 26,28 in abutting relationship with the ends 26,28 being surrounded by the pipe fitting 20. Each pipe 22,24 has a multilayer construction, in the illustrated embodiment a three layer construction, or alternatively is reinforced, for example by metallic wires, enabling the pipes 22,24 to be subjectable to a fluid pressure of greater than 25 bar without failure. The pipe fitting 20 includes an annular body 30 comprising a first generally radially inner part 32 and a second generally radially outer part 34. The first part 32 is composed of polyethylene and has an inner cylindrical surface 36 which defines a cylindrical cavity 38 therein. In use, the inner cylindrical surface 36 is, as shown in FIG. 2, adjacent and, following electrofusion, welded to the outer cylindrical surface 40,42 of the respective pipe ends 26,28.

The inner cylindrical surface 36 has provided therein an electrically conductive coil 44. The electrically conductive coil 44 typically comprises a helical coil of metal wire which may be coated with a plastics sleeve or layer, for example of polyethylene (not shown). The electrically conductive coil 44 which is provided in the inner cylindrical surface 36 may be on or slightly beneath the surface 36. The electrically conductive coil 44 is provided with two opposed ends 46,48 which are respectively connected to one of a pair of electrical terminals 50,52 which are provided on the annular body 30 for connection to a source of controlled electrical power (not shown).

An annular reinforcing member 54 surrounds the first part 36 and is disposed adjacent an outer annular surface 55 of the first part 36. The annular reinforcing member 54 comprises a circular ring of high tensile strength material, such as a metal, for example stainless steel, and/or fibre reinforced plastics. When a fibre reinforced plastics is employed, the fibre reinforcement may be selected from at least one of polyamide fibres, such as Kevlar (Registered Trade Mark) fibres, glass fibres and metal fibres, such as stainless steel fibres. The annular reinforcing member 54 is designed to have at least the same tensile strength in the hoop direction as that of the polyethylene pipes 22,24 around which the pipe fitting 20 is intended to be electrofused to form the pipeline. The annular reinforcing member 54 is typically provided with a sufficient tensile strength so that the pipeline incorporating the fittings 20 has a maximum pressure of greater than 25 bar.

The annular reinforcing member 54 and the radially inward first annular part 32 are surrounded by the radially outer second annular part 34 which is preferably composed of the same plastics material, such as polyethylene, as that of the first annular part 32. In the illustrated embodiment, the second annular part 34 has a greater length in the axial direction than the first annular part 32 thereby to provide opposed annular end portions 56,58 of the second annular part 34. The end portions 56,58 extend radially inwardly so as to have a respective inner surface 60,62 which is radially coincident with the inner cylindrical surface 36 of the first annular part 32. In this way, the first annular part 32 and the annular reinforcing member 54 are completely concealed by the second annular part 34 when the pipe fitting 20 is heat welded around the pipes 22,24.

In use, the two pipe ends 26,28 are slid into the cylindrical cavity 38 so as to be in an abutting relationship, with an abutment 64 between the pipe ends 26,28 being axially centrally located within the pipe fitting 20. The radius of the inner cylindrical surface 36 of the pipe fitting 20 is substantially the same as, or only slightly larger than, the radius of the outer cylindrical surface 40,42 of the pipes 22,24. The terminals 50,52 are then connected to a source of controlled electrical power at the required voltage and current for a predetermined period of time sufficient to cause the coil 44 to heat up and thereby melt the inner cylindrical surface 36 of the first annular part 32. When the coil 44 is coated with a plastic sleeve or layer, the plastic sleeve or layer also melts. The fusion of the plastics material of the pipe fitting 20 in this way causes melt displacement and fusion welding between the inner cylindrical surface 36 of the pipe fitting 20 and the outer cylindrical surfaces 42,44 of the pipes 22,24. On cooling, the molten material solidifies thereby forming a strong leak-free sealed joint around the pipes 22,24 by the pipe fitting 20.

When the resultant pipeline is subjected to high fluid pressure therein, for example at pressures greater than 25 bar, the presence of the annular reinforcing member 54 within the pipe fitting 20 imparts to the pipe fitting 20 which surrounds the abutment 64 a tensile strength in the hoop direction substantially the same as that of the remainder of the pipeline. Thus the electrofusion welded joint between the two pipes 22,24 has at least the same strength under high fluid pressure as the remainder of the pipeline.

Since the annular reinforcing member 54 is enclosed within the plastics annular body of the pipe fitting 20, the reinforcing member 54 is not likely to suffer from corrosion problems as are encountered by the known mechanical couplings of the prior art discussed hereinabove.

FIGS. 3(a), (b) and (c) show successive steps in the production of a pipe fitting in accordance with a second embodiment of the present invention.

In the production method, referring to FIG. 3(a) a substantially cylindrical core body 80 is provided around which is formed by winding an electroconductive coil 82. The electroconductive coil 82 is preferably a helical coil of metal wire which may be coated with a polyethylene sleeve or layer (not shown). The coil 82 has opposed free ends 84,86.

Thereafter, as shown in FIG. 3(b) an injection mould (not shown) is formed around the core 80 carrying the coil 82 and a first annular body part 88 of the pipe fitting is injection moulded around the coil 82 and the core body 80. The first annular body part 88 is preferably composed of polyethylene. An annular reinforcing member 90 which may have the construction and composition discussed hereinabove with reference to the first embodiment shown in FIG. 2 is disposed around the first annular body part 88 during the moulding step. The reinforcing member 90 has an inner radius which is substantially the same as the outer radius of the first annular body part 88.

Referring to FIG. 3(c), a second injection mould (not shown) is then formed around the assembly and a second annular body part 92 of the pipe fitting is injection moulded around the reinforcing member 90, the first annular body part 88 and the core body 80 to form the pipe fitting. In this second injection moulding step, the ends 84,86 of the coil 82 are electrically connected to terminals 94,96 moulded onto the second annular body part 92. As for the embodiment of FIG. 2, in this embodiment the second annular body part 92 encloses the opposed longitudinal ends 98,100 of the first annular body part 88 by opposed end walls 99,101 so that the first annular body part 88 and the annular reinforcing member 90 are completely concealed within the second annular body part 92.

Finally, the core body 80 is removed from the pipe fitting 103.

The method may be modified by carrying out a single step of simultaneously moulding the first and second annular body parts 88,90 with the reinforcing member 80 located therebetween. In this modified method an integrally moulded annular body is formed around the annular reinforcing member, this modified method being employed to product the embodiment of FIG. 4 described hereinbelow.

In the embodiment of FIG. 3, it may be seen that the core body 80 is provided with an outer cylindrical surface 102 which has a slightly raised cylindrical portion 104 around which the electroconductive coil 82 is wrapped. Accordingly, in the resultant pipe fitting, in the vicinity of the electroconductive coil 82 there is provided an annular depression 106 in the inner cylindrical surface 108 of the pipe fitting 103. Accordingly, when the pipe fitting 103 is located around opposed ends of two plastics pipes to be fused and welded together, the presence of the depression 106 provides an annular cavity into which molten plastics material may flow in the electrofusion process to provide an enhanced fusion weld between the two plastics pipes.

Referring to FIG. 4, there is shown a pipeline incorporating a pipe fitting 220 in accordance with a second embodiment of the present invention. As for the first embodiment, the pipeline includes plastics pipes, for example of polyethylene, having a multilayer construction, and the pipes typically having a diameter of from 25 to 630 mm. The pipe fitting 220 includes an integral annular body 230 which is composed of polyethylene and has preferably been formed during a single injection moulding step. The annular body 230 has an inner cylindrical surface 236 which defines a cylindrical cavity 238 therein. As for the embodiment of FIG. 2, in use the inner cylindrical surface 236 is adjacent and, following electrofusion, welded to the outer cylindrical surface 240,242 of respective pipe ends 226,228. The inner cylindrical surface 236 has provided therein an electrically conductive coil 244, which may have the same configuration as electrically conductive coil of the embodiment of FIG. 2. The electrically conductive coil 244 may be on or slightly beneath the inner cylindrical surface 236. The electrically conductive coil 244 is provided with two opposed ends 246,248 which are respectively connected to one of a pair of electrical terminals 250,252 which are provided on the annular body 230 for connection to a source of controlled electrical power (not shown).

An annular reinforcing member 254 is disposed within the annular body 230 and is completely surrounded and enclosed by the annular body 230. The annular reinforcement 254 comprises a circular ring of high strength material, such as a metal, for example stainless steel and/or fibre reinforced plastics, as for the embodiment of FIG. 2. Again, as for the embodiment of FIG. 2, the annular reinforcing member 254 is designed to have at least the same tensile strength in the hoop direction as that of the polyethylene pipes 222,224 around which the pipe fitting 220 is intended to be electrofused to form the pipeline. The annular reinforcing member 254 is typically provided with a sufficient tensile strength so that the pipeline incorporating the fitting 220 has a maximum pressure of greater than 25 bar.

Figure 5A:
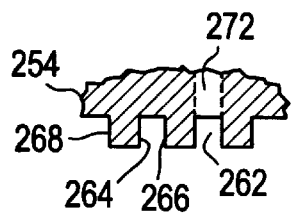
FIGS. 5(a), (b), (c) and (d) show alternative configurations of the grooved surface of the annular reinforcing member.
Figure 5B:
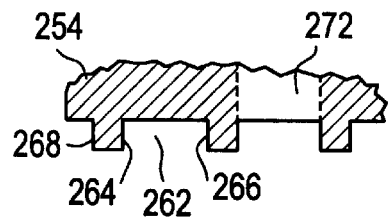
Figure 5C:
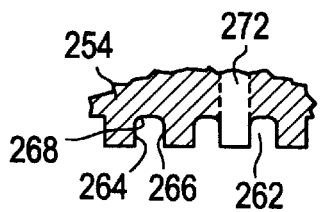
Figure 5D:
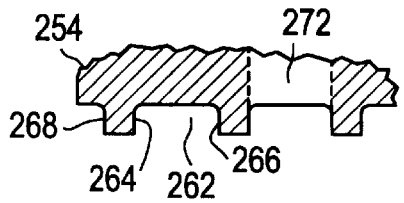

The annular reinforcing member 254 differs from that incorporated into the first embodiment shown in FIG. 2. In particular, the inner cylindrical surface 256 of the annular reinforcing member 254 is provided with a grooved surface profile 260. The grooved surface profile 260 is constituted by a plurality of annular grooves 262, or at least one helical groove 262, formed in the inner surface 256 of the annular reinforcing member 254. As shown more clearly in FIG. 5, the grooves present a plurality of substantially axially (i.e. longitudinally along the length of the pipe fitting and of the ultimate pipeline) facing groove surfaces 264,266 on raised portions 268 between adjacent grooves 262 directed in opposing axial directions along the axis of the pipe fitting 220. As shown in FIG. 5(a), the groove shape may be square in section. Alternatively, as shown in FIGS. 5(b), 5(c) and 5(d) the groove shape may respectively be rectangular, rounded square or rounded rectangular in section. Typically, the groove depth is from 1.5 to 6 mm and the groove width is from 2 to 12 mm.

In the illustrated embodiment, only the inner cylindrical surface 256 of the annular reinforcing member 254 is provided with a grooved surface profile 260. However, in an alternative embodiment, either or additionally the outer cylindrical surface 270 of the annular reinforcing member 254 is provided with a grooved surface profile 260. During injection moulding, the polyethylene material shrinks and is moulded into the grooves 262. If the outer cylindrical surface 270 is grooved, when the annular body 230 is moulded by injection moulding around the annular reinforcing member 254, the polyethylene material of the annular body 230 shrinks radially inwardly into the grooves 262 formed on the outer cylindrical surface 270. This provides the advantage of complete filling of the grooves 262 by the polyethylene material with a reliable maximum surface area interface between the inner and outer cylindrical surfaces 256,270 and the polyethylene of the annular body 230. The grooves 262 may be made by machining, pressing or moulding.

The provision of a grooved surface profile 260 on the annular reinforcing member 254 enhances the ability of the reinforced pipe fitting comprising the annular reinforcing member 254 moulded within the thermoplastic annular body 230 to absorb longitudinal forces when the pipe fitting is used, particularly when the pipe fitting is used in a high pressure pipeline. In particular, it is the provision of the axially facing groove surfaces 264,266 which resist relative longitudinal displacement of the polyethylene material of the annular body 230 and the annular reinforcing member 254, and thus enhance the strength of the pipe fitting.

Considering the stress applied to the pipe fitting in use, as a result of internal pressurisation of the fluid in the pipeline the pipe fitting is subjected to a longitudinal (i.e. axial) stress which is one half the annular hoop stress. The maximum longitudinal stress which the pipe fitting may be subjected to is equal to the yield stress of the polyethylene material comprising the annular body 230. In other words:

$$\sigma_{hoop\ max} = 2 \times \sigma_{yield\ PE}$$

where $\sigma_{hoop\ max}$ is the maximum hoop stress and $\sigma_{yield\ PE}$ is the yield stress of the polyethylene material.

When a smooth surface of the annular reinforcing member is provided, the smooth surface does not influence the longitudinal stress. However, when the surface of the annular reinforcing member is provided with a grooved profile in accordance with this embodiment, the maximum hoop stress is increased according to the following formula:

$$\sigma_{hoop\ max} = 2 \times \sigma_{yield\ PE} \times (n/2+1)$$

where n=L/W where L is the longitudinal length of the weld zone between the pipes and the pipe fitting and W is the groove width.

It may accordingly be seen that an increase in the number of grooves (n) increases the maximum hoop strength to which the pipe fitting may be subjected in use prior to failure.

Referring again to FIGS. 4 and 5(a), (b), (c) and (d), the annular reinforcing member 254 is also provided with a plurality of bridging perforations 272 between the radially outer portion 273 and the radially inner portion 274 of the integrally moulded polyethylene annular body 230. The perforations 272 are preferably distributed over the area of the annular reinforcing member 254. The bridging perforations 272 may comprise circular holes, typically having a diameter substantially the same as the width of a groove. Alternatively, the bridging perforations 272 may comprise linear slits which are oriented in an annular direction around the annular reinforcing member 254. Preferably, such slits have a width substantially the same as that of a groove 262 and a length ranging from 2 to 10 times that of the width. For either configuration of bridging perforations 272, the perforations 272 may be separated by a axial distance which is from 2 to 10 times the thickness of the polyethylene annular body 230.

The bridging perforations 272 provide the advantage that when the pipe fitting is stressed in use, both by a hoop stress and a longitudinal stress, the bridging perforations 272 permit a more secure interconnection between the radially outer portion 273 and radially inner portion 274 of the annular body 230 thereby resisting deformation of the polyethylene of the annular body and enhancing the reinforcing effect of the annular reinforcing member 254.

In the illustrated embodiments, there is shown a linear pipe fitting for connecting two pipes of the same diameter together. The pipe fitting may be configured to connect pipes of different diameter together, either in a linear orientation or as an elbow or curve. The melt displacement resulting from electrofusion of the plastics material accommodates the diameter difference to ensure a reliably sealed joint. The pipe fitting may also be configured to connect more than two pipes together, for example three pipes by way of a T-fitting.

The present invention will now be illustrated in greater detail with reference to the following non-limiting Example.

EXAMPLE

Two pipe fittings having the structure illustrated in FIG. 2 were injection moulded so as to incorporate a metallic annular reinforcing member. The pipe fittings were shaped and dimensioned for coupling together polyethylene pipes which were reinforced to be operable at high internal pressure, the pipes having an external diameter of 40 mm. The pipe fittings were welded by electrofusion welding onto the pipes. The resultant pipeline section was submitted to pressure tests at a temperature of 80 degrees Centigrade. At 80 degrees Centigrade, under a pressure of 60 bars, no failure in the pipeline was observed after a test period of 165 hours. At a temperature of 80 degrees Centigrade, under a pressure of 80 bars, also no failure was observed for a test period of 165 hours. This latter result shows that the electrofusion welding pipe fitting of the invention in combination with a reinforced polyethylene pipe can sustain a pressure 10 times higher than a conventional monolayer polyethylene pipeline system employing conventional pipe fittings.

What is claimed is:

1. A pipe fitting for coupling together opposed ends of two plastics pipes by fusion welding, the pipe fitting comprising an annular body having an inner cylindrical surface of plastics material surrounding a cylindrical cavity for receiving opposed ends of two plastics pipes to be coupled together, an electrically conductive coil provided in said inner cylindrical surface and surrounding the cylindrical cavity, the coil having opposed ends, a pair of terminals each connected to a respective end of the coil and provided on the body for connection to a source of controlled electrical power, and an annular reinforcing member disposed in the body and surrounding the coil, the annular reinforcing member having a grooved surface which interfaces the annular body, the grooved surface defining a plurality of axially facing surfaces, and said annular reinforcing member having sufficient tensile strength so that the pipeline incorporating the fitting is subjectable to a fluid pressure greater than 25 bars without failure.

2. A pipe fitting according to claim 1 wherein the annular body is composed of injected moulded plastics and comprises an inner annular part and an outer annular part surrounding the inner annular part and the annular reinforcing member is positioned between the inner and outer annular parts.

3. A pipe fitting according to claim 1 wherein the grooved surface is provided on at least one of an outer cylindrical surface and an inner cylindrical surface of the annular reinforcing member.

4. A pipe fitting according to claim 3 wherein the grooved surface comprises a plurality of annular grooves or at least one helical groove, on the respective cylindrical surface.

5. A pipe fitting according to claim 3 wherein the or each groove is defined between a pair of opposing axially facing surfaces of the annular reinforcing member.

6. A pipe fitting according to claim 5 wherein the axially facing surfaces are defined by a groove profile selected from a square, rectangular, rounded square, or rounded rectangular groove shape.

7. A pipe fitting according to claim 1 wherein the or each groove has a depth of from 1.5 to 6 mm and a width of from 2 to 12 mm.

8. A pipe fitting according to claim 1 wherein the annular reinforcing member is further provided with a plurality of perforations extending therethrough.

9. A pipe fitting according to claim 8 wherein each perforation is circular in area.

10. A pipe fitting according to claim 9 wherein each circular perforation has a diameter substantially equal to a width of a groove.

11. A pipe fitting according to claim 8 wherein each perforation is formed as a linear slit extending in an annular direction.

12. A pipe fitting according to claim 11 wherein each slit has a width substantially equal to a width of a groove and a length of from 2 to 10 times the width of the slit.

13. A pipeline including at least two polyethylene pipes having opposed ends which are coupled together by at least one pipe fitting according to claim 1, the inner cylindrical surface of the annular body being fusion welded to an outer cylindrical surface of each pipe end, wherein the annular body is composed of polyethylene and the annular reinforcing member has at least the same tensile strength in a hoop direction as that of the polyethylene pipes.

14. A pipeline according to claim 13 wherein the pipes are selected from multilayer pipes and reinforced pipes and the pipeline has a maximum pressure of greater than 25 bar.

15. A pipe fitting for coupling together opposed ends of two plastics pipes by fusion welding, the pipe fitting comprising an annular body having an inner cylindrical surface of plastics material surrounding a cylindrical cavity for receiving opposed ends of two plastics pipes to be coupled together, an electrically conductive coil provided in said inner cylindrical surface and surrounding the cylindrical cavity, the coil having opposed ends, a pair of terminals each connected to a respective end of the coil and provided on the body for connection to a source of controlled electrical power, and an annular reinforcing member disposed in the body and surrounding the coil, the annular reinforcing member having a grooved surface which interfaces the annular body, the grooved surface defining a plurality of axially facing surfaces, and wherein the annular reinforcing member is further provided with a plurality of perforations extending therethrough.

16. The pipe fitting according to claim 15, wherein each perforation is circular in area.

17. The pipe fitting according to claim 16, wherein each circular perforation has a diameter substantially equal to a width of a groove.

18. The pipe fitting according to claim 16, wherein each perforation is formed as a linear slit extending in an annular direction.

19. The pipe fitting according to claim 18, wherein each slit has a width substantially equal to a width of a groove and a length of from 2 to 10 times the width of the slit.

20. A pipeline including a least two polyethylene pipes having opposed ends which are coupled together by at least one pipe fitting wherein the pipe fitting includes:

an annular body having an inner cylindrical surface of plastics material surrounding a cylindrical cavity for receiving opposed ends of the two plastics pipes to be coupled together, an electrically conductive coil provided in said inner cylindrical surface and surrounding the cylindrical cavity, the coil having opposed ends, a pair of terminals each connected to a respective end of the coil and provided on the body for connection to a source of controlled electrical power, and an annular reinforcing member disposed in the body and surrounding the coil, the annular reinforcing member having a grooved surface which interfaces the annular body, the grooved surface defining a plurality of axially facing surfaces; wherein the inner cylindrical surface of the annular body is fusion welded to an outer cylindrical surface of each pipe end, wherein the annular body is composed of polyethylene and the annular reinforcing member has at least the same tensile strength in a hoop direction as that of the polyethylene pipes; and wherein the pipes are selected from multilayer pipes and reinforced pipes and the pipeline has a maximum pressure of greater than 25 bar.

* * * * *